United States Patent
Soupliotis et al.

(10) Patent No.: US 7,315,325 B2
(45) Date of Patent: Jan. 1, 2008

(54) VIDEO PROCESSING SYSTEM AND METHOD FOR AUTOMATIC ENHANCEMENT OF DIGITAL VIDEO

(75) Inventors: Andreas Soupliotis, Bothell, WA (US); Padmanabhan Anandan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 11/380,757

(22) Filed: Apr. 28, 2006

(65) Prior Publication Data
US 2006/0187342 A1    Aug. 24, 2006

Related U.S. Application Data

(62) Division of application No. 10/186,562, filed on Jun. 28, 2002, now Pat. No. 7,119,837.

(51) Int. Cl.
*H04N 5/228* (2006.01)
(52) U.S. Cl. .................... 348/222.1; 382/276
(58) Field of Classification Search .......... 348/208.99, 348/222.1; 382/276
See application file for complete search history.

(56) References Cited

U.S. PATENT DOCUMENTS

| 6,690,729 B2* | 2/2004 | Hayashi | 375/240.16 |
| 7,061,524 B2* | 6/2006 | Liu et al. | 348/208.4 |
| 2004/0091170 A1* | 5/2004 | Cornog et al. | 382/276 |
| 2005/0110875 A1* | 5/2005 | Ma et al. | 348/208.1 |

* cited by examiner

*Primary Examiner*—Tuan Ho
(74) *Attorney, Agent, or Firm*—Lyon & Harr, L.L.P.; Craig S. Fischer

(57) ABSTRACT

An automatic video enhancement system and method for automatically enhancing video. The automated video enhancement method uses frame-to-frame motion estimation as the basis of the video enhancement. Motion estimation includes the computation of global motion (such as camera motion) and the computation of local motion (such as pixel motion). The automated video enhancement method includes generating global alignment transforms, generating optic flow vectors, and using these global alignment transforms and optic flow vectors to enhance the video. The invention also includes video processing and enhancement techniques that use the frame-to-frame motion estimation. These techniques include a deinterlace process, a denoise process, and a warp stabilization process that performs both damped and locked stabilization.

6 Claims, 8 Drawing Sheets

VIDEO PROCESSING SYSTEM AND METHOD FOR AUTOMATIC ENHANCEMENT OF DIGITAL VIDEO

CROSS REFERENCE TO RELATED APPLICATIONS

This application is a divisional application of U.S. Ser. No. 10/186,562, entitled "Video Processing System and Method for Automatic Enhancement of Digital Video," filed Jun. 28, 2002, now U.S. Pat. No. 7,119,837, the entire contents of which is hereby incorporated by reference.

BACKGROUND

Video cameras (or camcorders) are devices that are popular with amateur videographers for home use. Video cameras may be a digital camera, which stores a digital video on a memory device, or an analog video camera, which stores video footage on magnetic videotape. Video footage captured by an analog video camera may be converted to digital video using well-known techniques. Digital videos may be processed using software running on a computing devices (such as personal computers) to edit and manipulate the data captured by video cameras.

As avid movie and television watchers, most people are accustomed to viewing professionally produced movies and video. However, our home videos are often a dramatic departure from this. Home videos are overwhelmingly shot by amateur videographers who generally have little training in shooting video. Consequently, these amateurs frequently make poor decisions about what and how to shoot video. The result is video footage that is difficult to watch because it contains aesthetic defects such as shaky footage, noise, color imperfections, and so forth.

Editing software is available that is capable improving some of the defects in the home video footage. However, current video editing software for amateur use is modeled after professional editing systems. This tends to make the software difficult for the average consumer to use. Accordingly, there exists a need for a video processing system and method that is easy for the average consumer to user and effectively and efficiently corrects common defects is amateur or home video footage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention disclosed herein includes an automated video enhancement system and a method for automatically enhancing video captured by a camera. The system and method corrects and ameliorates aesthetic defects of flawed video footage. This flawed video generally is photographed by amateurs. Because of the level of automation therein, the invention is particularly well-suited for the processing of amateur home video.

The invention includes correcting common video defects such as brightness, focus, and camera movement problems. The input to the system and process is an original, flawed video footage and the output is corrected, enhanced video. The system includes a pipeline of interconnected image and video processing techniques that rely heavily on understanding the motion of objects between in a video sequence from the input video.

The automated video enhancement method makes extensive use of frame-to-frame motion estimation. This motion estimation includes the computation of global motion (such as camera motion) and the computation of local motion (such as pixel motion). The automated video enhancement method computes global motion computation on the input video to generate global alignment transforms. These global alignment transforms correct for global motion due to camera motion. In addition, the automated video enhancement method performs local motion compensation using the global alignment transforms to generate optic flow vectors. These optic flow vectors represent the motion of the corresponding pixel both forward and backward in time. Using these global alignment transforms and optic flow vectors, a variety of video processing and enhancement techniques can be used to enhance the input video.

These video processing and enhancement techniques include the following. A deinterlace process generates frames (instead of fields) for the processing and enhancement technologies to use. The deinterlace process may also be used to obtain high-quality still images from the video. The deinterlacing process uses a motion-compensated process that makes use of the optic flow vectors. A denoising process is also available to remove unwanted noise from the video. Denoising involves using a motion-compensated denoising process that applies a robust temporal integration across locally (i.e. optic flow) aligned frames using the motion vectors in a neighborhood of the frame being denoised.

The invention also includes a stabilization process that performs both damped and locked stabilization. The warp stabilization process uses the global alignment transforms to stabilize the entire video. Empty area caused by the warp stabilization process can be repaired using a mosaic stitching process of the invention. Missing pixels are replaced by stitching together a mosaic at every missing frame by borrowing pixels from nearby frames. Because stabilization can induce blur, the invention includes a process to discover and eliminate blurry frames. New, sharp frames can replace the blurry frames using frame interpolation to warp pixels forward and backward along flow vectors. Frame interpolation can also be used for slow motion, or creating video from stills. In addition, the automated video enhancing system and method includes a standard automatic brightness, contrast adjustment and saturation increase to improve the visual fidelity of the video. The invention also includes a linear image sharpening filter applied to every frame to sharpen the video. Although the processing is automated, a user has the ability to choose to perform or skip an enhancement process.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the invention, reference is made to the accompanying drawings, which form a part thereof, and in which is shown by way of illustration a specific example whereby the automated video enhancement system and method may be practiced. It is to be understood that other embodiments may be utilized and structural changes may be made without departing from the scope of the present invention.

I. General Overview

The automated video enhancement system and method disclosed herein can be used to process a video containing aesthetic defects such as jitter, noise and focus problems. The automated video enhancement system and method are a pipeline of processing and enhancement technologies combined in a unique manner that allow an automated enhancement of flawed video.

The basic process of the automated video enhancement system and method involves frame-to-frame motion estimation. Motion estimation includes both global motion compensation and local motion compensation. The general idea is that video is redundant, but needs to achieve a commonalty in motion. The global and local motion compensations are an equalizing factor that allows motion to be taken into account.

Global motion compensation involves the computation of a motion of the camera that captured the video. On the other hand, local motion compensation involves motion on a local scale—a pixel scale. Using optic flow vectors, local motion compensation determines a motion of each pixel in every frame. As discussed in detail below, once the optic flow vectors are determined many enhancement processes can be performed on the video.

Figure 1:
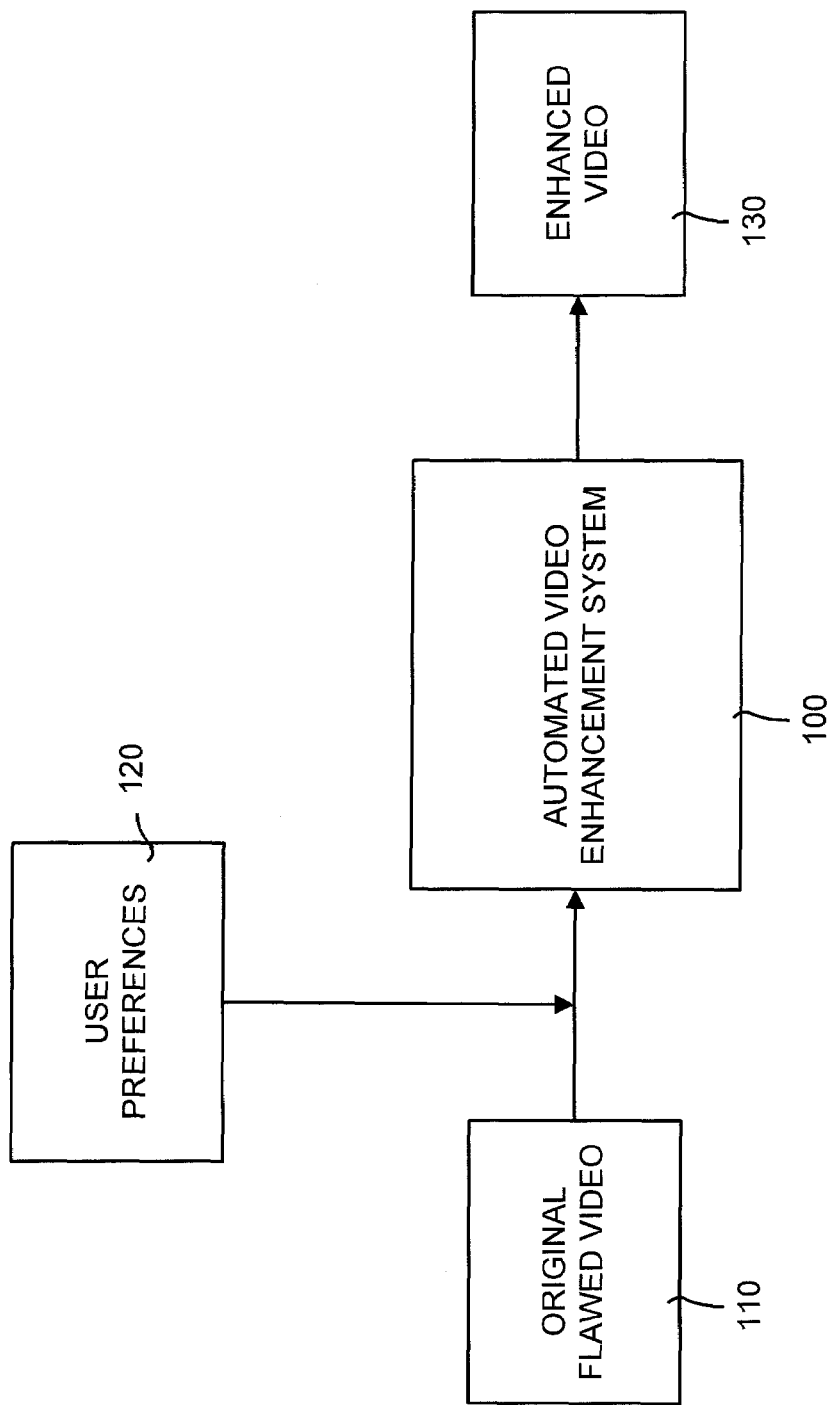
FIG. 1 is a general block diagram illustrating an overview of the automated video enhancement system and method.

FIG. 1 is a general block diagram illustrating an overview of the automated video enhancement system and method. The input for the automated video enhancement system 100 is an original, flawed video 110. The flawed video 110 may contain such common defects as camera shaking, excessive noise and focus problems. Using the automated video enhancement system 100, a user is able to automatically enhance the flawed video 110 and correct many common defects.

The automated video enhancement system 100 have a variety of different video processing and enhancement technologies that can be used on the flawed video 110. The user has the opportunity to indicate his user preferences 120 as to which of the processing and enhancement technologies the user wants the automated video enhancement system 100 to apply to the flawed video 110. Once the user makes these user preferences 120 known to the system 100 the remainder of the enhancement process is automatic. Once the processing by the system 100 is completed according to user preference 110, the system 100 outputs an enhanced video 130.

II. Exemplary Operating Environment

The automated video enhancement system 100 of the invention disclosed herein is designed to operate in a computing environment. The follow discussion is intended to provide a brief, general description of a suitable computing environment in which the invention may be implemented.

Figure 2:
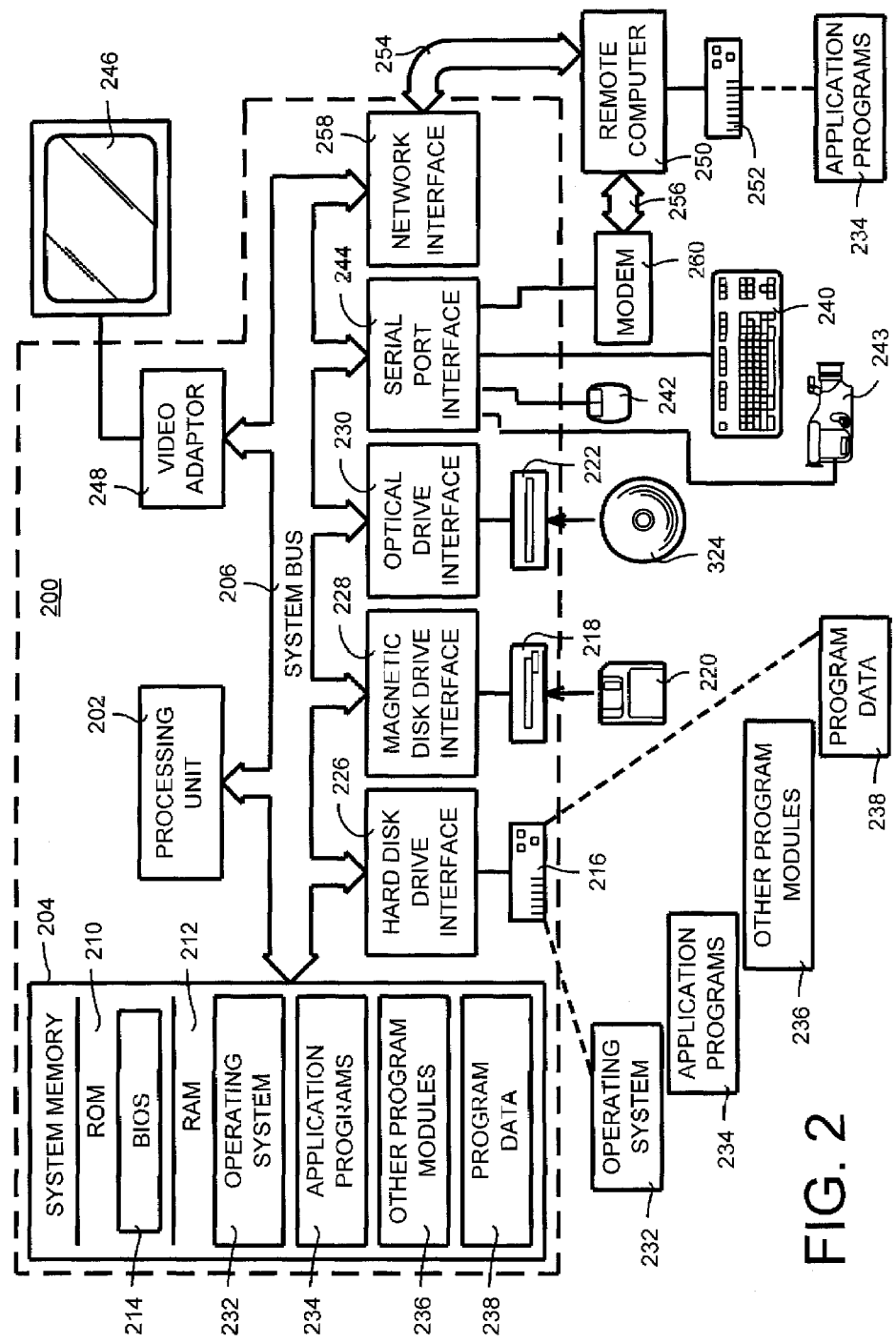
FIG. 2 is a block diagram illustrating a computing apparatus suitable for carrying out the invention.

FIG. 2 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 2, an exemplary system for implementing the invention includes a general-purpose computing device 200. In particular, the computing device 200 includes the processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the computing device 200, such as during start-up, is stored in ROM 210. The computing device 200 further includes a hard disk drive 216 for reading from and writing to a hard disk, not shown, a magnetic disk drive 218 for reading from or writing to a removable magnetic disk 220, and an optical disk drive 222 for reading from or writing to a removable optical disk 224 such as a CD-ROM or other optical media. The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the computing device 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 (such as the wide-angle image de-warping system 100) and program data 238. A user (not shown) may enter commands and information into the computing device 200 through input devices such as a keyboard 240 and a pointing device 242 (such as a mouse). In addition, a camera 243 (such as a video camera) may be connected to the computing device 200 as well as other input devices (not shown) including, for example, a microphone, joystick, game pad, satellite dish, scanner, or the like. These other input devices are often connected to the processing unit 202 through a serial port interface 244 that is coupled to the system bus 206, but may be connected by other interfaces, such as a parallel port, a game port or a universal serial bus (USB). The monitor 246 (or other type of display device) is also connected to the system bus 206 via an interface, such as a video adapter 248. In addition to the monitor 246, computing devices such as personal computers typically include other peripheral output devices (not shown), such as speakers and printers.

The computing device 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the computing device 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the computing device 200 is connected to the local network 254 through a network interface or adapter 258. When used in a WAN networking environment, the computing device 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the computing device 200, or portions thereof, may be stored in the remote memory storage device 252. It will be appreciated that the network connections shown are exemplary and other means of establishing a communications link between the computers may be used.

III. Operational Overview and Details

Figure 3:
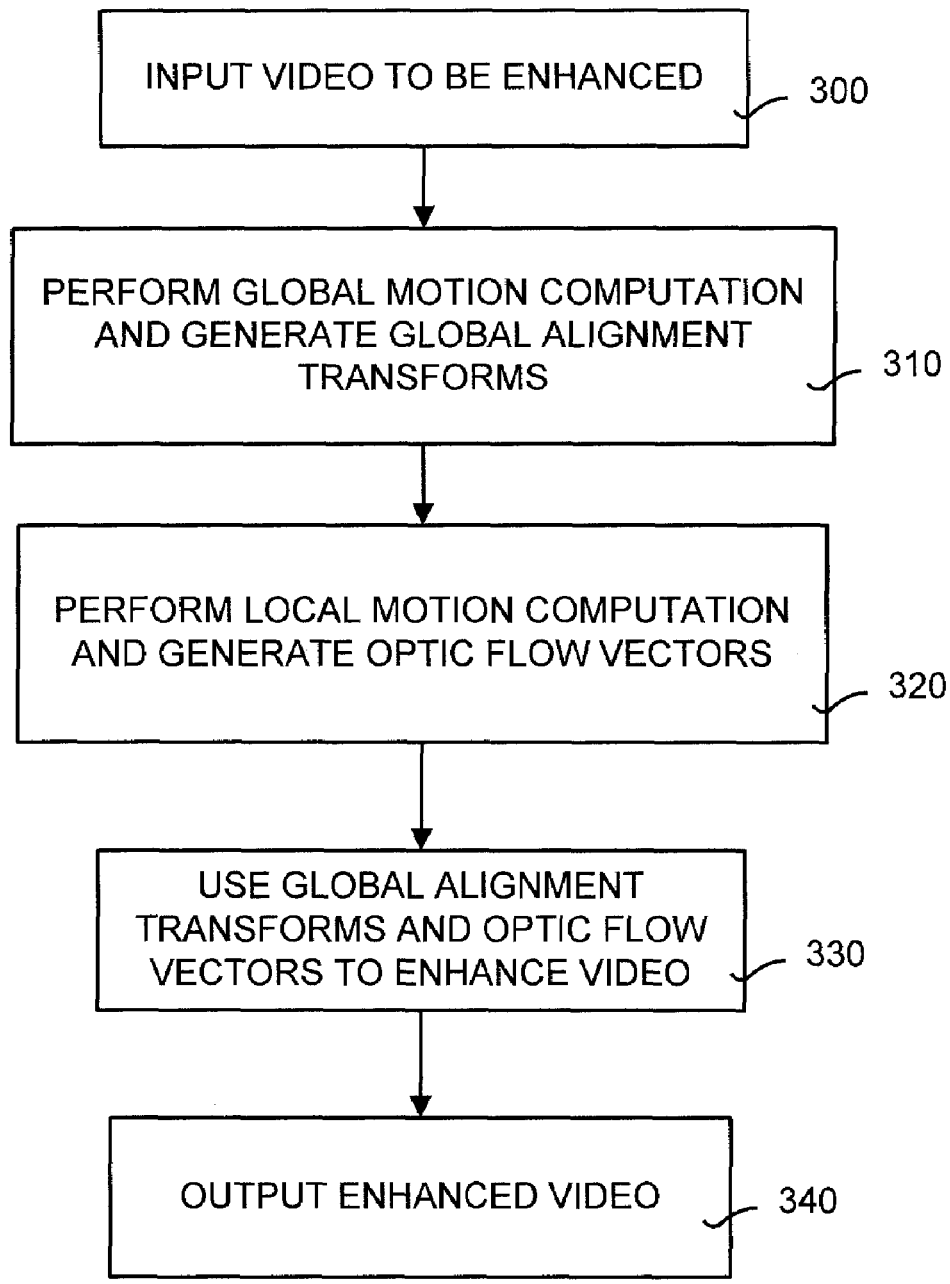
FIG. 3 is a flow diagram illustrating an operational overview of the automated video enhancement system shown in FIG. 1.

FIG. 3 is a flow diagram illustrating an operational overview of the automated video enhancement system shown in FIG. 1. In general, the automated video enhancement system and method input a video having aesthetic defects and output a corrected and enhanced video. Specifically, as shown in FIG. 3, a video to be enhanced is received as input (box 300). Next, global motion computation is performed on the input video to generate global alignment transforms (box 310). The global motion computation corrects for global motion due to camera motion.

Next, local motion compensation is performed on the input video using the global alignment transforms to generate optic flow vectors (box 320). These optic flow vectors are computed for every pixel in every frame. Each optic flow vector represents the motion of the corresponding pixel both forward and backward in time. The global alignment transforms and the optic flow vectors then are used to process and enhance the input video (box 330). Once the processing and enhancement is completed, the enhance video is sent as output (box 340).

Figure 4:
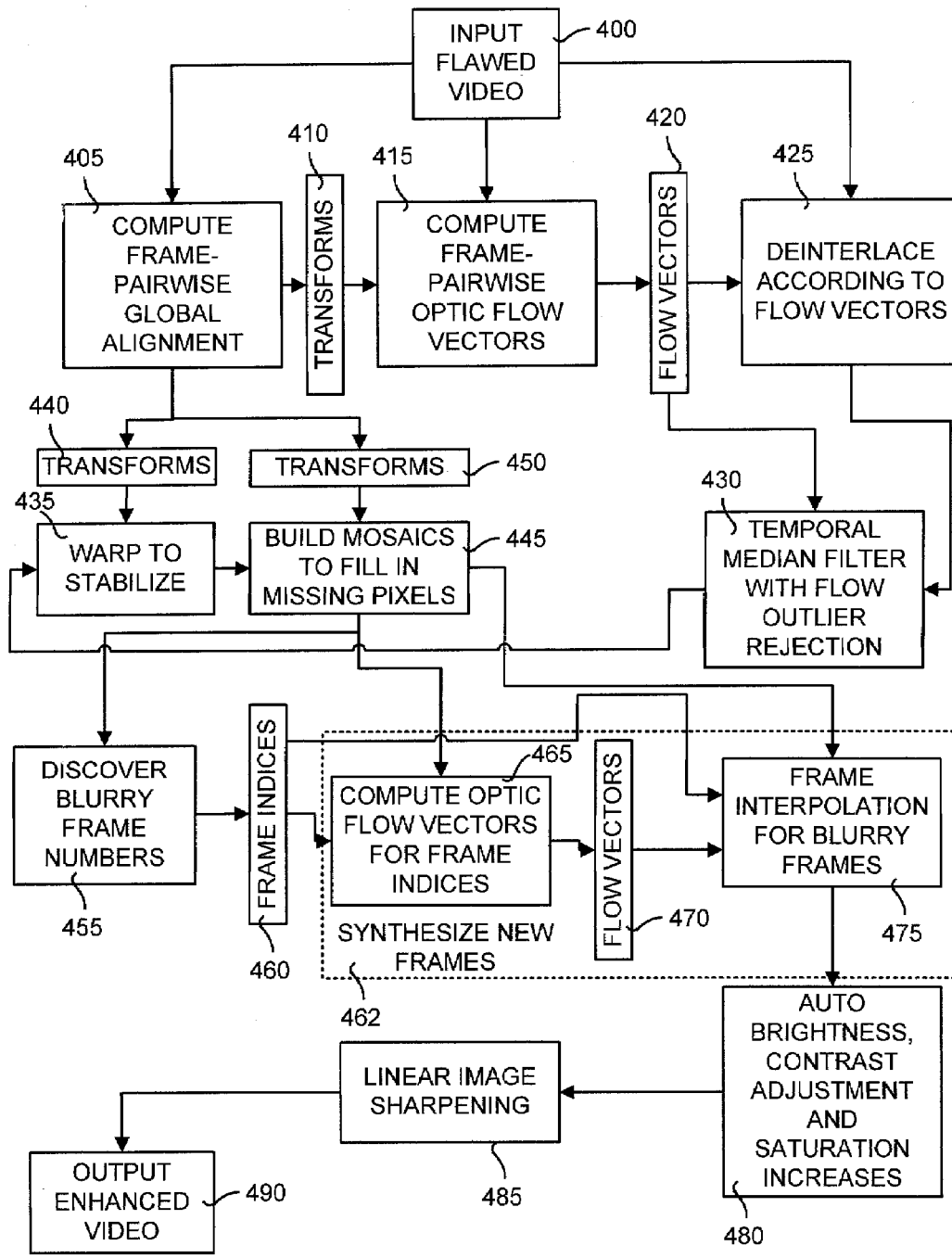
FIG. 4 is a detailed flow/block diagram illustrating the details of the automatic video enhancement system and method.

FIG. 4 is a detailed flow/block diagram illustrating the details of the automatic video enhancement system and method. In particular, a flawed video is received as input (box 400). Next, for each frame in the input video a pairwise global alignment is computed (box 405). This operation computes the transformation that aligns or registers a frame with its neighboring frame to the right. A transformation is computed at every frame. The transformation is an affine similarity transform (i.e. a scale, rotation, and translation). This pairwise global alignment is computed using a pairwise affine transformation from frame to frame to frame. The output of (box 405) are global alignment affine transforms (box 410).

Next, the local motion compensation is performed. Given the input video (box 400), this operation computes the per-pixel motion translation from one frame to the next. The result is called an optic flow vector field. This is computed for every frame in the input video sequence. As shown in FIG. 4, the inputs to (box 415) are the global alignment affine transforms (box 410) and the input video (box 400). The frame-pairwise optic flow vectors then are computed (box 415). This computation computes optic flow vectors from frame to frame to frame. It should be noted that the global alignment is performed before the local motion computation because the optic flow vectors become more accurate once the camera motion is canceled out. The output of (box 415) are optic flow vectors (box 420).

Once the global motion estimation and the local motion estimation computations have been made, the input video can be deinterlaced. Since most of the processing and enhancement technologies used in the automated video enhancement system are based on frames (as opposed to fields), the deinterlacing typically is performed near the beginning of the enhancement process.

The input to (box 425) is the input video (box 400) and the optic flow vectors (box 420). A motion-compensated deinterlacing then is performed to deinterlace the input video according to the optic flow vectors (box 425). This is an optional step, and is useful if a user wishes to extract a high-quality still from video. Interlacing artifacts can severely degrade the quality of a still extracted from video. A frame can be intelligently synthesized from one field by using the optic flow to warp and field-interpolate the missing field. This operation is also useful as a preprocess to many vision effects such as tracking, as tracking in fields tends to give erroneous results. The output from (box 425) is a deinterlaced video.

Consumer video often contains unpleasant noise. This noise often comes from the charge-coupled device's (CCD's) reaction to poor lighting. A motion-compensated denoising process is used that applies a robust temporal integration across locally (i.e. optic flow) aligned frames using the motion vectors in a neighborhood of the frame being denoised. However, in the presence of noise, optic flow can be unreliable. Therefore, pixels in the temporal integration where the flow has been accurately computed are favored. Locations where the optic flow is accurate can be determined by warping an image forward by the flow vectors and seeing how well it registers (locally) with the next frame. The deinterlaced video then is fed into the temporal median filter having flow outlier rejection (box 430). Another input to (box 430) are the optic flow vectors. The optic flow vectors ensure that the deinterlaced video is motion compensated. The output from (box 430) is a deinterlaced, denoised video.

The deinterlaced, denoised video is fed into (box 435), which performs a warp to stabilize. Warp to stabilize (box 435) also accepts the global alignment affine transforms (box 440) that were calculated by the global alignment (box 405). The warp to stabilize (box 435) takes the global alignment affine transforms and the deinterlaced and denoised video and stabilizes the entire video. The output of warp to stabilize (box 425) is a stabilized, deinterlaced, denoised video. The warp to stabilize process removes the unpleasant camera jitter that is often found in handheld-shot video. Once the pairwise-global alignment between frames has been computed, the video sequence can be stabilized relative to any reference frame in the sequence. The process works as follows: Suppose a user wishes to stabilize a sequence to frame 0. The global alignment of frame "i" in the sequence to the reference frame is computed by concatenating (multiplying) the global transformations from frame 0 to 1, 1 to 2, 2, to 3, and so on, up to i-1 to i. The resulting transformation is the transformation that warps 0 to i. The inverse of this transformation is then applied to frame i. The warped frame i should look very much like frame 0. But, because the transformations have been concatenated over time, some drift may have been introduced into the solution. To alleviate this, aligning transformation is computed again. The result is a stabilized sequence, with no motion relative to frame 0.

The "warp to stabilize" process applies a similarity transformation to every image. This can result in void, empty areas in the border of the image in the coordinate system of the reference frame. These missing pixels need to be replaced. This can be done by stitching together a mosaic at every frame by borrowing pixels from nearby frames that have been aligned. A list of candidate pixels is built that can be borrowed from, and then a robust temporal operator is applied on the list to yield the replaced pixel. In preparation for replacing these pixels, a mosaic is built (box 445). Input to (box 445) is the stabilized, deinterlaced, denoised video as well as global alignment affine transforms (box 450). The global alignment affine transforms (box 450) are used to stitch together different parts of the image and create the mosaic. Output from (box 445) is denoised, deinterlace, stabilized, full-frame video.

Next, a process is performed to discover blurry frames (box 455). Input to (box 455) is the denoised, deinterlace, stabilized, full-frame video. Because the video has been stabilized, the camera motion has been removed, and blurring (such as motion blur) can occur. While stabilization is a great thing to apply to video to make it more aesthetically pleasing to watch, it surfaces another problem that exists in the video: motion blur due to handheld jitter. The cancellation of camera motion but preservation of motion blur is disturbing to the eye. It is not normal to see motion blur in the video now that there is no more motion. The solution for this is to first discover which frames contain blur. This involves computing the Laplacian energy for every frame. Next, the median of the Laplacian energy is computed within a neighborhood of frames. A frame is considered to be blurry if its Laplacian energy is significantly lower than the median. The frame numbers that contain the motion blur are stored for future use in the system. The output from (box 455) are frame indices (box 460).

Once it has been determined which frames are blurred, the optic flow field is computed between the two closest, sharp frames that the blurry frame lays. The assumption here is that the motion between these two frames will be small enough that the optic flow can be accurately computed. Moreover, at this point in the pipeline the images have been stabilized. The input to the compute optic flow vectors for frame indices (box 465) are frame indices (box 460) and the denoised, deinterlace, stabilized, full-frame video. Once blurry frames are discovered, these frames are discarded. One problem, however, is that what is left are missing frames. These frames need to be replaced. The solution is to synthesize the new frames to replace the discarded frames (box 462). The processes contained in this process are shown in FIG. 4 as a dashed-line box (box 462). In general, the new frames are synthesized using interpolation to fill in the missing frames. The missing frames are interpolated using forward and rearward warping (discussed in detail below). Initially, however, new optic flow vectors need to be computed using (box 465). The output of (box 465) are the new optic flow vectors (box 470).

Once the optic flow field has been calculated from the previous sharp to the next sharp frame of a blurry frame, new, sharp frames can be interpolated by warping the pixels forward and backward along the flow vectors, and then blending. This process is known as frame interpolation. Frame interpolation can also be used for slow motion, or creating video from stills. The frame interpolation for blurry frames (box 475) inputs the new optic flow vectors (box 470), the frame indices (box 460) and the denoised, deinterlaced, stabilized, full-frame video. The output of (box 475) is new video that has blurring eliminated, and contains only sharp frames.

Next, standard automatic brightness, contrast adjustment and saturation increase (box 480) processing is performed on the new video. An automatic brightness and contrast enhancement can improve the visual fidelity of the video. This basically remaps the luminance values of every pixel to a higher dynamic range. In addition, each pixel is converted from RGB space to Hue, Lightness, Saturation (HLS) space. Moreover, the saturation is increased by 5%. This tends to make the colors more vibrant and attractive. In order to make the system fully automated, one aspect of the invention has the system automatically choosing the parameters for this processing.

A linear image sharpening filter (box 485) also can be applied to every frame to sharpen the new video. This is a simple linear sharpening filter applied to every frame. Its purpose it to output a sharper image for every frame in the video sequence. Finally, the output is an enhanced video. It should be noted that each of the previous processes are optional and, based on user preferences, can be performed or skipped.

IV. Processing and Enhancement Techniques

The automated video enhancement system and method includes several different processing and enhancement techniques. The techniques have in common that they use global and local motion computation. Each of the techniques available will now be discussed.

Stabilization

Home video typically has unwanted jitter and motion that makes the video look unprofessional. In general, there are two types of stabilization that user desires. First is a locked stabilization. This stabilization has the effect putting the camera on a tripod. All camera motion relative to a selected frame is removed. Second is a damped stabilization. Damped stabilization acknowledges that the camera is moving, but tries to find and alleviate hand-held jitter. Thus, a differentiation needs to be made between intended camera motion and hand-held jitter.

At the heart of stabilization processing is computing frame-wise pair-wise global alignment (or image registration). With image registration, misaligned frames are registered with a reference frame. This is performed on a frame-to-frame basis. In addition, this is done for all pixels in each frame, not just a single pixel, and is performed automatically.

The general idea is to examine two successive frames. Because there should be no transformation (such as a rotation), a relationship can be solved for that maps a first image to a second image. This is done by solving for an affine transformation. An affine transformation is a two-dimensional rotation, scale and translation. The relationship is then undone and the camera motion is cancelled. By default, reference frame is the initial frame. If, for some reason, the user wished to change the reference frame, the user has the capability to change the default reference frame to a later frame in time.

Figure 5A:
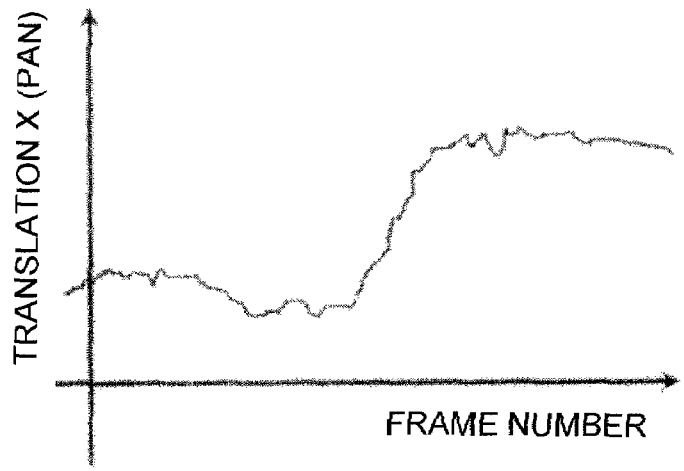
FIG. 5A illustrates a plot made of the actual motion of a camera used in the stabilization process.
Figure 5B:
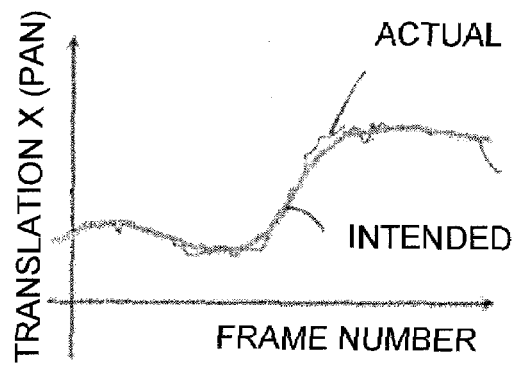
FIG. 5B illustrates a plot of both an actual motion curve shown in FIG. 5A and a smoothed intended motion curve
Figure 5C:
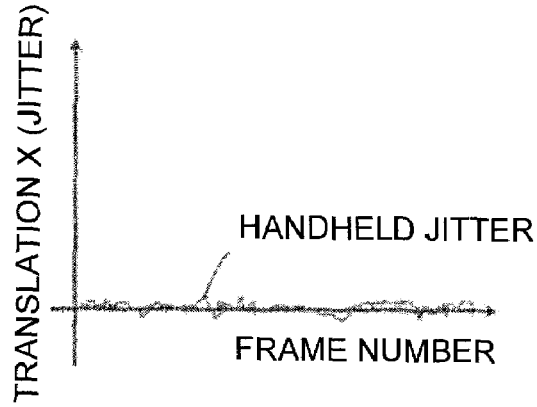
FIG. 5C illustrates the difference between the actual and intended motion curves.

Damped stabilization seeks to differentiate between hand-held jitter and intended motion. This is achieved by computing pairwise alignment transformations for frames t+1 to t. The transform the is decomposed (A=SRT) and a scale, rotation angle, and translation (x,y) is extracted. Graphically, FIG. 5A illustrates a plot made of frame number vs. translation (X) to obtain a squiggly curve showing actual motion. The actual motion curve is smoothed out using a low-pass filter, and the results shown in FIG. 5B are obtained, where both the squiggly actual motion curve and the smooth intended motion curve are illustrated. FIG. 5C illustrates the difference between the actual and intended motion curves. This difference yields the handheld jitter.

Locked stabilization cancels out all camera motion. A user chooses a reference frame to lock on, and a frame-wise pair-wise global motion is computed. Using concatenation, a transformation is calculated at each frame to locked frame. One problem with canceling motion is that this leads to missing pixels. Any frame after the stabilization process will have missing areas because of the global affine transform. These void areas must be filled in. The invention accomplishes this by taking every frame in the neighborhood (usually about 30 neighboring frames) of a given frame is warped towards the given frame having void areas. The accuracy of the alignment (or warp) is recorded. If the aligned images are accurate and if they cover part of the void areas, then those areas are kept. Ideally, the entire void area can be covered, but it should be noted that this may not always be the case.

After the video has been stabilized, frames that have blur appear "strange" to the eye. This occurs because the motion has been canceled. The invention discovers the blurry frames and discards those frames. Next, new sharp frames are synthesizes to replace the discarded blurry frames.

The blurry frames (such as those with motion blur) are discovered by computing the Laplacian energy of each frame in the neighborhood (such as the previous 30 frames in time and the subsequent 30 frames in time). Frames that have sudden low energy values are attributed to blur. The frames then are ranked in order from most "blurry" to most "sharp", according to the Laplacian energy. All frames below approximately the 10th percentile then are discarded. These are the blurriest of frames.

New sharp frames can be synthesized by using a previous "sharp" frame to the left (earlier in time) of a given frame and a next "sharp" frame to the right (later in time) of the given frame. An optic flow interpolation algorithm then is used to synthesize the in-between frames (the missing frames). This method is most accurate if the time distance is very small (i.e. a few frames).

Time Warp

Many times a user wants to see a video sequence in slow motion. In order to do slow motion, addition frame need to be generated in between the existing frames. One way to create additional frames is by duplication. However, this method comes out look too jerky and robot-like. Another method is to blend a first frame and a second frame to create a new third frame. This method, however, does not work well when there are fast-moving objects in the video. Fast-moving objects appear to have a tail, an effect known as "ghosting".

The time warp process of the invention uses optic flow vectors to perform linear interpolation in time. In order to achieve linear interpretation in time, the motion of every single pixel in the frame needs to be understood. The optic flow vectors provide this information. Optic flow is a motion (vector) field for each and every pixel in the frame.

In order to create the missing frame, the pixels in a previous frame (in time) to the missing frame are used. Forward warping along the optic flow vectors is performed to generate the new in between frame. Thus, we warp each pixel along 50% of each flow vector. Similarly, pixels from the next frame (in time) to the missing frame are used. Backward warping is performed in a backward direction along 50% of each flow vector. Thus, a bi-directional flow is used to obtain the missing frame by warping forward along the optic flow vectors for a frame prior in time to the new frame, and warping backward along the optic flow vectors for a frame after in time to the new frame. This process is repeated again until the two images converge.

Denoising

Digital cameras introduce noise from the charge-coupled device (CCD). The purpose of denoising is to remove the noise but keep the video frames sharp and keep the detail. One technique to reduce noise is to apply a blurring filter. However, this technique adds blur and removes detail from the video.

Figure 6:
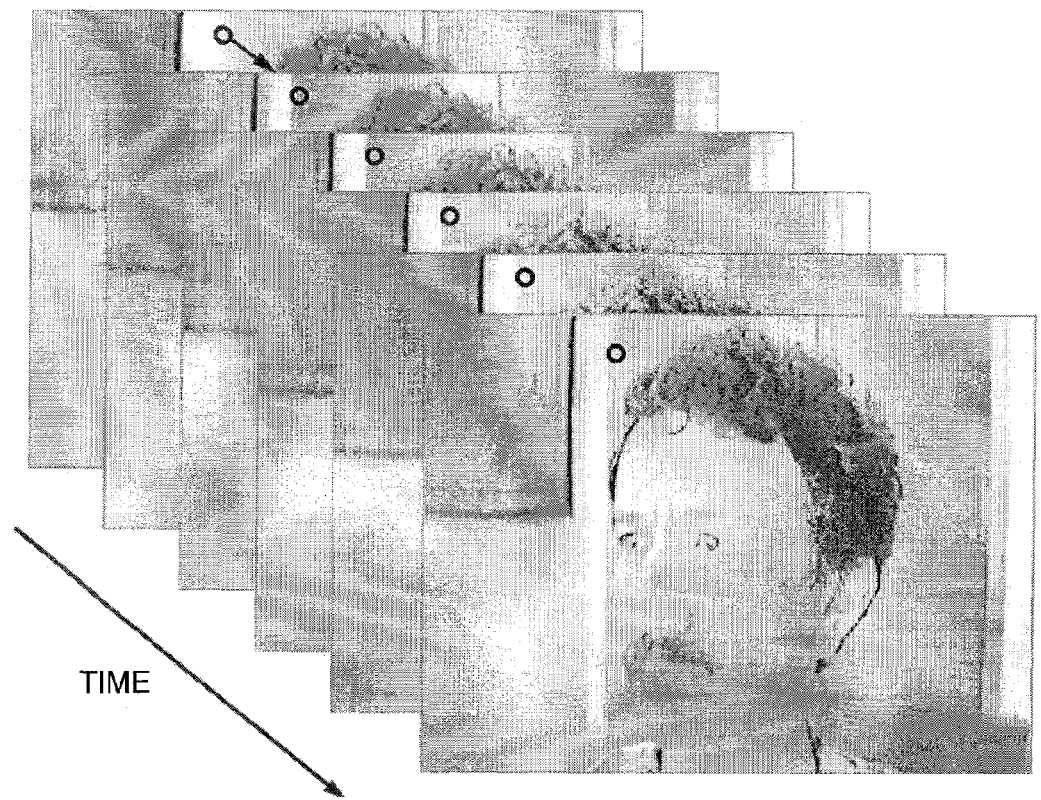
FIG. 6 illustrates a space-time cube used in the denoising process.

The denoising process of the invention uses temporal filtering. More specifically, a temporal filter is applied to each and every frame. This is achieved by constructing a space-time cube and applying the temporal filter to the space-time cube. As shown in FIG. 6, the space-time cube is constructed by stacking up all the video frames. This creates a temporal redundancy. Although the frames will be close, they will not be exactly the same. The difference between the frames is the noise. Thus, by filtering in time through the space-time cube, the noise can be isolated and eliminated.

Temporal filtering works well on static areas in the video but has less than desirable results on areas of motion in the video. The denoising process of the invention solves this problem by using motion-compensated temporal filtering to filter in time rather than filter in space. Because there is motion is some areas of the video, and because filtering occurs through a space-time cube, the temporal filter only works well in static areas where the pixels align one on top of each other. However, if the pixels do not align, such as where there is motion, then there is a problem.

Figure 7:
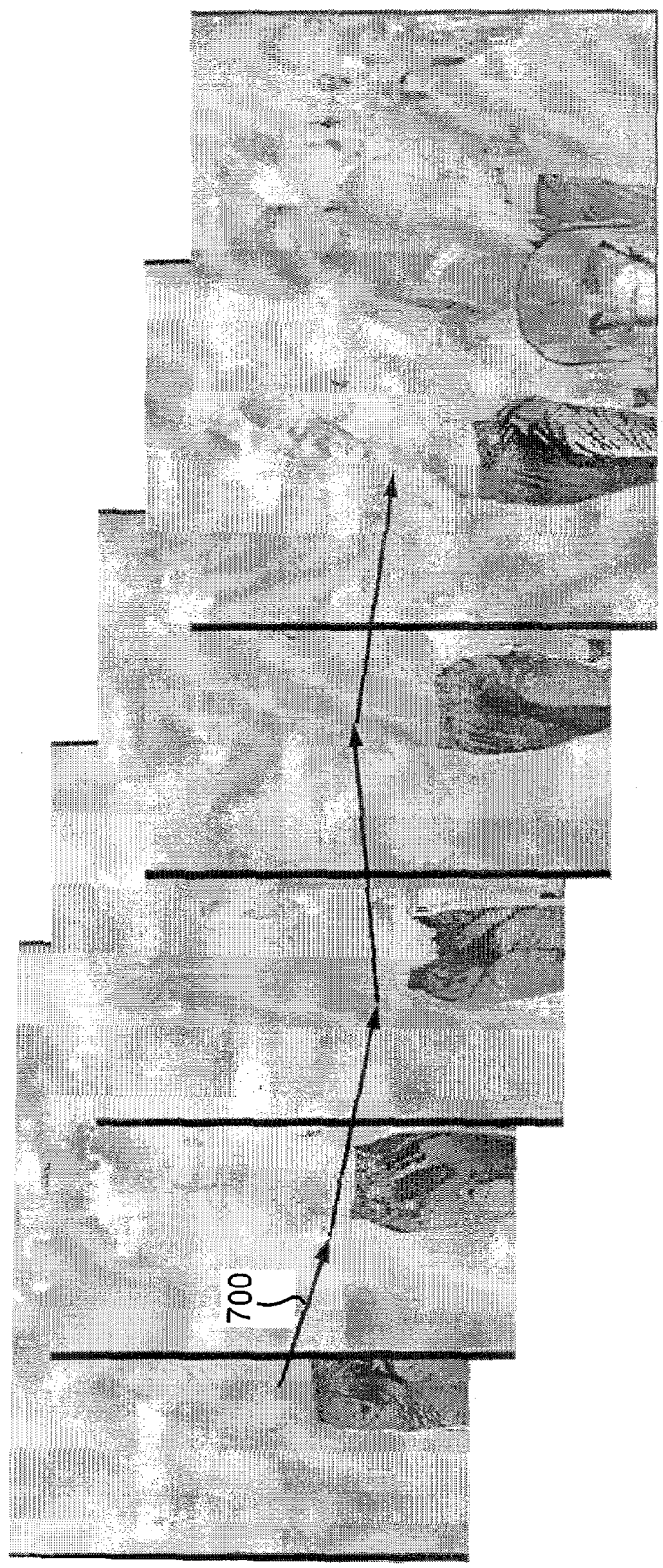
FIG. 7 illustrates an example of motion-compensated temporal filtering used in the denoising process.

Optimal denoising algorithms filter in time, not just in space. But blindly filtering in time introduces motion blur because objects are moving. The solution is to use motion-compensated temporal filtering to filter along the optic flow vector trajectories. This eliminates motion blur and ensures that filtering occurs across common pixels. A median filter is used, which is more robust than an averaging filter, and a median in time is computer instead of an average. A temporal median filter is used because it is much better than a temporal average filter since the temporal median filter is more robust to outliers. FIG. 7 illustrates an example of motion-compensated temporal filtering. The line 700 represents the optic flow trajectory and filtering is performed along the line 700. Next, each frame in a temporal window is warped to the central frame in the window. A temporal filter then is computed on the warped neighborhood.

One problem, however, is that a catch-22 situation occurs, because optic flow is often unreliably computed in the presence of noise. Thus, it becomes important to determine which flow vectors are erroneous and which are accurate. This is achieved by warping a given frame forward along the flow vectors. Pixels with good flow will have the same intensity value at that pixel location in the next frame. On the other hand, pixels with bad flow will not look like the pixels in the next frame. A per-pixel "score" of how close the match is between the warped frame and the next frame is obtained and recorded. Next, when it is time for the temporal integration or filtering step, pixels with bad scores are penalized. In addition, pixels belonging to frames closer to the frame being enhanced are given a higher score because of their proximity. This proximity reward function (or weights) is a Gaussian, and is centered at the current frame. In this manner, the integration step takes into account the accuracy of the optic flow during the denoising process.

Deinterlacing

A video frame is constructed of two fields. One field, such as $field_1$, has only odd lines, and the other field, such as $field_2$, has only even lines. Thus, even lines are missing in $field_1$ and odd lines are missing in $field_2$. For subsequent fields, the order is repeated.

Merging $field_1$ and $field_2$ (the odd and even fields) creates a single frame. This process of taking $field_1$ and $field_2$ and combining them is called deinterlacing. The point of doing things this way is that the higher the frame rate the smoother the motion in the video. Video is actually 60 fields/second, not 30 frame/second. Displaying 60 fields/second is more aesthetically pleasing and comfortable to the human eye than displaying 30 frames/second.

All of the techniques discussed above need a full frame of video to operate. This means that deinterlacing needs to occur prior to using these techniques. Merging two fields is not a very effective way to deinterlace, because optical problems such as motion blur and defocus occur.

Figure 8:
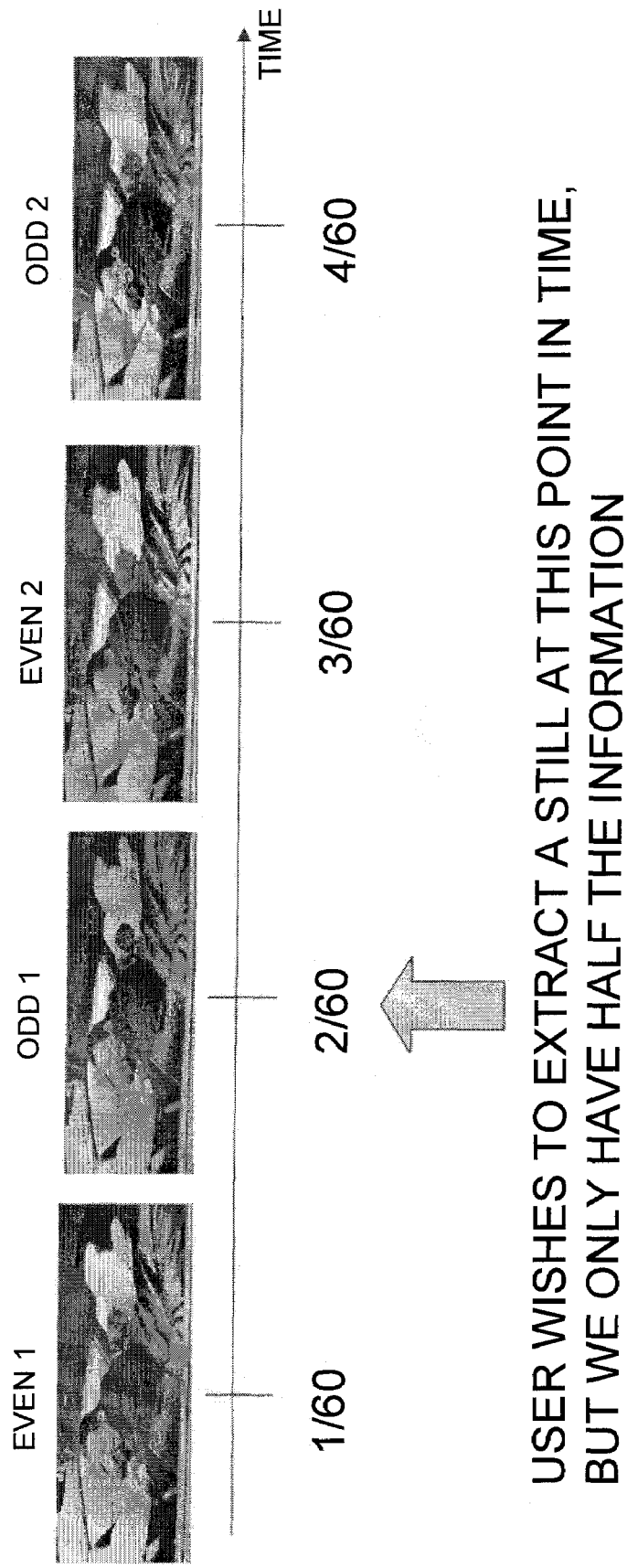
FIG. 8 illustrates an example of motion compensated deinterlacing for making a frame from fields.

The deinterlacing process of the invention uses optic flow vectors to deinterlace. FIG. 8 illustrates an example of motion compensated deinterlacing for making a frame from fields. In this example, suppose that a user wants to generate a frame at time $t_2=2/60$. An even frame needs to be generated. The current even field is missing, but at time $t_1=1/60$ there is an even field and at time $t_3=3/60$ there is an even field. The invention uses optic flow vectors to generate the current even field using the previous and next even fields. Using motion compensated deinterlacing, the previous even field at time $t_1=1/60$ is warped forward along the optic flow vectors. Similarly, the next even field at time $t_3=3/60$ is backward warped along the optic flow vectors. This process generates a current even field at time $t_2=2/60$. This motion compensated deinterlacing can also be performed for odd fields.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for decreasing a frame rate in a video having video frames to obtain a slow motion video, comprising:
    determining an optic flow vector for each pixel within a first one of the video frames;
    warping each pixel within the first one of the video frames forward in time by approximately 50 percent;
    generating a new video frame using the warping immediately after in time the first one of the video frames; and
    repeating the above process until all necessary new video frame have been generated.

2. The method as set forth in claim 1, further comprising warping each pixel within a second one of the video frames backward in time by approximately 50 percent, the second one of the video frames being located after in time the first one of the video frames.

3. The method as set forth in claim 2, further comprising continuing a forward and a backward warping until the first one of the video frames and the second one of the video frames converge.

4. The method as set forth in claim 1 further comprising performing denoising of the video using the optic flow vector and a temporal median filter having flow outlier rejection.

5. The method as set forth in claim 4 further comprising performing motion-compensated deinterlacing using the video and the optic flow vector.

6. The method as set forth in claim 5 further comprising performing warp stabilization using global alignment transforms.

* * * * *